Dec. 10, 1935. D. P. THOMSON 2,023,623
INDICATING DEVICE FOR CAMERAS FOR PREVENTING
DOUBLE EXPOSED FILMS AND LOSS OF FILMS
Filed Jan. 18, 1933   2 Sheets-Sheet 2
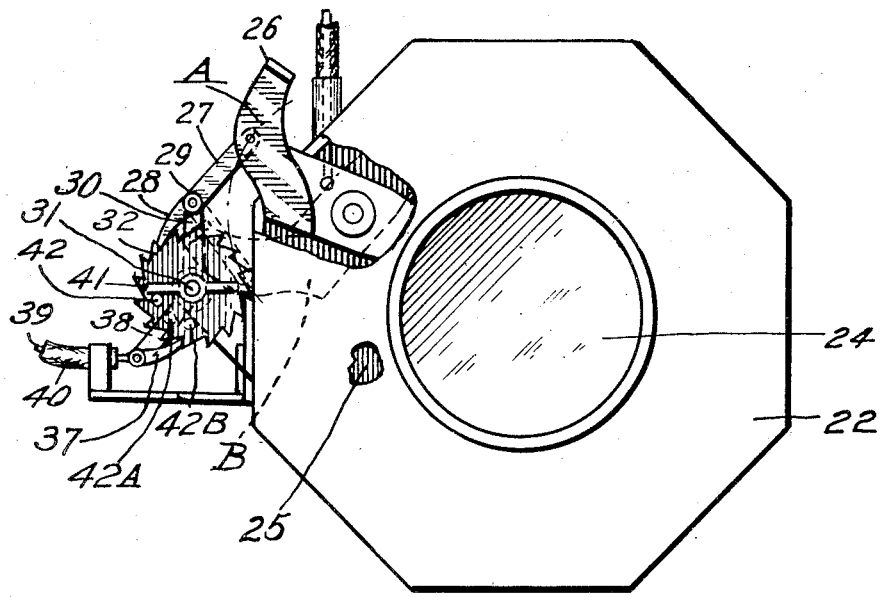
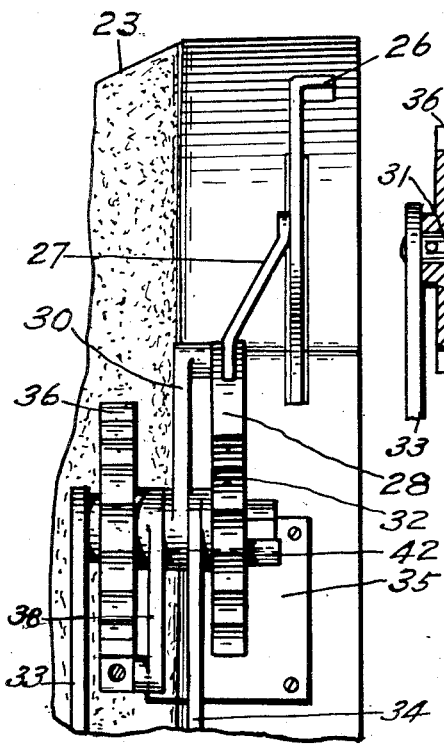
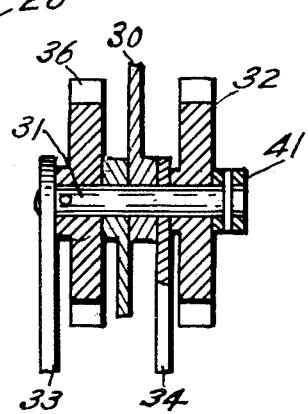
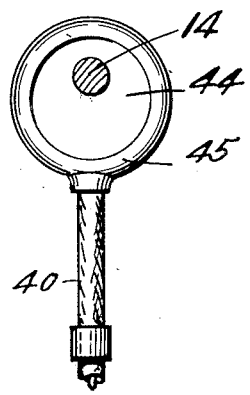
Inventor,
David P. Thomson,
by Frank G. Hattie
Attorney.

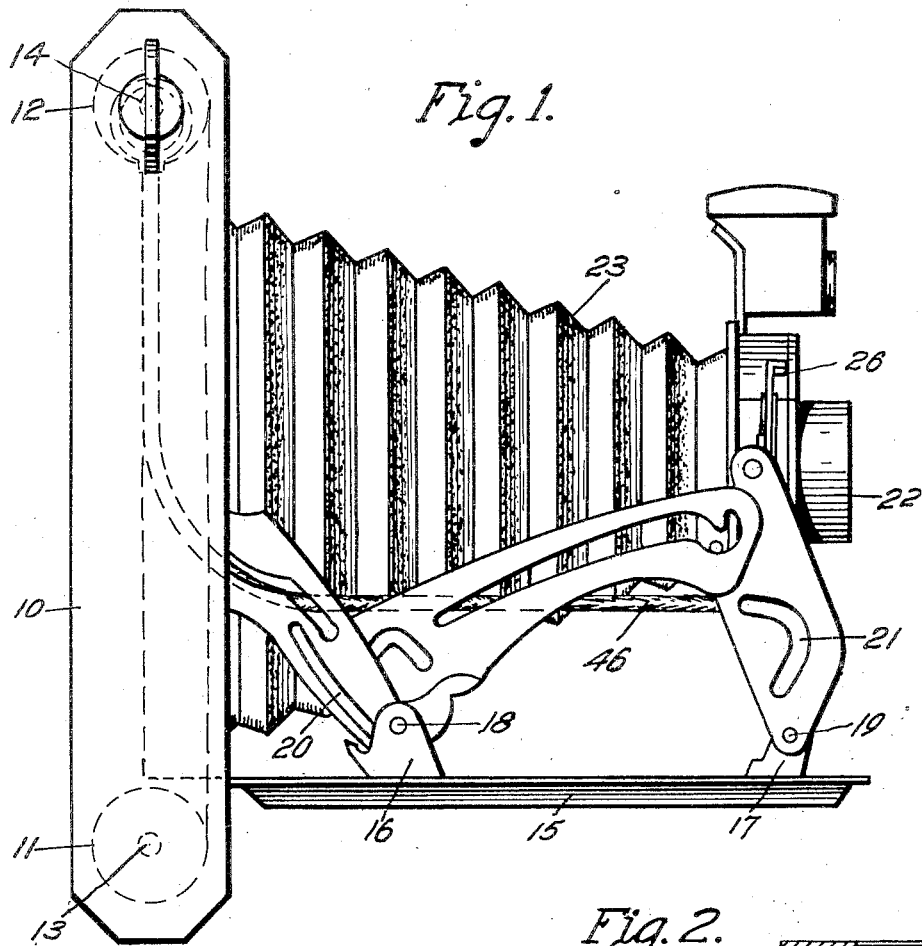
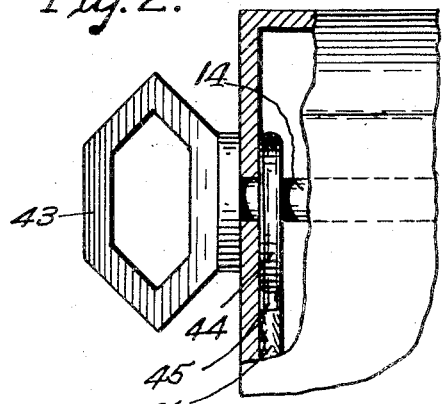

Patented Dec. 10, 1935

2,023,623

UNITED STATES PATENT OFFICE 2,023,623

INDICATING DEVICE FOR CAMERAS FOR PREVENTING DOUBLE EXPOSED FILMS AND LOSS OF FILMS

David P. Thomson, Lynn, Mass.

Application January 18, 1933, Serial No. 652,280

7 Claims. (Cl. 95—32)

The invention relates to improvements in cameras in general to prevent double exposure of the films and also prevent loss of films due to the uncertainty of knowing whether a film has been turned into the next position or not.

The camera is provided with a box having a hinged cover on its base with a swinging downward movement on which is mounted a sliding frame that supports the lens and the lens casing. The mechanism is connected to the back of the box by a bellows to allow the operating parts to be adjusted to the varying opening and closing movements of the folding camera.

When the picture is made the base or cover is released in the usual way and swings down at right angles to the box and the lens is drawn towards the front the required distance to focus it. When the front is pushed back the cover is closed over the opening in the box and the camera members are folded into position within the small area of the said box.

The invention consists of novel devices which can be operated by the shutter lever of the camera with the least possible effort and strain by utilizing the movement of the shutter lever for exposing the film and an indicating device operated simultaneously with it to register whether the film has been exposed or not.

By this movement the indicator is turned to such a position that the user will always know the position of the film to show that another exposure should not be made until the film has been turned to the next position. When the film is turned the indicator is reset into the normal operating position.

The invention further consists of details of construction of the device to operate the indicator by the movement of the shutter lever, which movement will allow the indicator to remain in position until the winding operation of the film takes place and by the movement of the film shaft the indicator through an eccentric on the shaft will reset the indicating device by a flexible cable for operating a follow-up device which resets the indicator to the normal operating position. The invention further consists of using a reciprocating movement of the shutter lever to increase the movement of the travel of the indicator.

Probably one-third of the films used in cameras are wasted by double exposure or lost by the uncertainty of knowing whether the film has been turned or not and to obviate this condition is the main embodiment of the invention.

The object of the invention is to provide an indicating device for cameras to prevent double exposure of the films or to prevent the loss of films due to the uncertainty of knowing whether the film has been turned or not. A further object of the invention is to provide fool-proof devices to indicate the position of the film in relation to its exposure through the lens by the shutter lever which is durable and cheap to manufacture.

Referring to the figures:

Fig. 1 is a side elevation of a camera showing the relation of the indicating and resetting devices.

Fig. 2 is a detailed view of the film-winding reel with the resetting device on the film shaft.

Fig. 3 is a front elevation of the lens casing with the indicating device in position.

Fig. 4 is a side elevation of the same.

Fig. 5 is a longitudinal section through the indicating device.

Fig. 6 is a side elevation of an eccentric attached to the film shaft for resetting the indicator.

Referring to the drawings Figs. 1 to 6 which illustrate a camera provided with a novel indicator for preventing exposures of films and for resetting the device after each exposure. The camera casing is indicated by the numeral 10 in which is located a film supply spool 11 and a winding spool 12. The spools are mounted on the shafts 13 and 14 which have bearings in the casing 10. The shaft 14 extends outwardly at one end to support the winding handle which operates at the same time an eccentric secured to the shaft for resetting the indicating device to show that the film has been turned. The main view of the drawings shows a folding camera having a cover 15 hinged to the casing 10.

Secured to the cover 15 are lugs 16 and 17 having guiding pins 18 and 19 which cooperate with the cam slots in the levers 20 and 21 at one end and pin shafts at the opposite end cooperating with the slots in the levers, one of which is secured to the casing 10 and the other to the lens casing 22 and the casing 10.

The film chamber in the casing and the lens casing are connected by a bellows 23. The casing is provided with a lens 24 through which the light is admitted to the film for taking the photograph.

The lens is provided with a shutter 25 which is operated by a hand lever 26 for controlling the light and exposing the film. It is well known that double exposure of the light on films is a common menace to photography and destroys pictures and to obviate this condition is the main embodiment of the invention.

The shutter lever 26 is operated by hand and the opposite end operates the shutter. The lever swings in an arc "A" to the dotted position "B" as shown in Fig. 3. This downward movement of the shutter lever 26 is the range of movement to operate the device for preventing double exposure or the loss of films.

Pivotally secured to the shutter lever 26 is a link 27, the opposite end of which is provided with a ratchet pawl 28 fulcrumed at 29. Also fulcrumed at 29 is a lever 30 which is free to swing on the ratchet wheel shaft 31 to guide the pawl 28 into the path of the ratchet wheel.

As the shutter lever 26 moves downwardly into position, shown in dotted lines it imparts a rotating movement to the ratchet wheel 32 through the link 27 and the pawl 28. The ratchet wheel 32 is loosely mounted on the shaft 31 and operates the indicating device 42 located thereon and is the main embodiment of the invention. The arcing movement of the lever 26 in both directions determines the total travel of the ratchet wheel and the indicator 42 for showing the exposure of the film. That is, the lever 26 travels downwardly across the center of thrust and moves the ratchet ahead and on its return it also passes the center of thrust and again moves the ratchet ahead. The second distance of travel moves the indicator the full length of travel until the indicator is returned by the winding handle, when the next operation takes place.

The shaft 31 is mounted in the bearings 33 and 34 forming part of the supporting frame 35. Rigidly secured to the shaft at its opposite end is another ratchet wheel 36 which is rotated by the pawl 37 fulcrumed on the lever 38 which is free to swing on the shaft 31. Connected to the pawl 37 and the lever 38 is a cable 39 which has an axial movement in the cable cover 40. The cable is connected to the film changing device and imparts an axial movement to it which in turn imparts a rotating movement to the ratchet wheel 36 through the pawl 37 and the lever 38 for operating the follow-up device for the indicating mechanism.

Rigidly secured to the opposite end of the shaft is the follow-up device 41 which is operated by the film changing device after it has been exposed and comes in contact with the pin 42 operated by the ratchet wheel which receives its movement from the shutter lever 26, link 27, and pawl 28.

To indicate the position of the film to show whether it has been exposed or not, the operator swings the shutter lever downwardly into position shown in dotted lines Fig. 3. This movement causes the ratchet wheel to rotate the distance of the dotted position of the pin 42—A and the return movement of the shutter lever moves a ratchet wheel to the next position of the pin 42—B. This is the limit of the movement of the pin in the indicating position showing that the film has been exposed and should be turned to the next film before the next operation takes place.

To make the device fool-proof the resetting of the indicator is made by the film changing operation. The operator when changing the film turns the handle 43 mounted on the shaft 13. The movement of rotation oscillates an eccentric 44 for resetting the follow-up device of the indicator. The movement of the eccentric 44 imparts a movement to the eccentric strap 45 which is connected at 46 to a cable 39, the cable having an axial movement in the cover 40 imparts an oscillating movement to the ratchet wheel 32, shaft 31, and follow-up device 41. The oscillating movement imparted to the ratchet wheel must be equal to the travel of the indicator pin 42 to make the definite contact showing the film is in position for the next operation and further rotating mechanism can take place without disturbing the shutter lever.

In operation the shutter levers are moved in the usual manner thereby causing the ratchet wheel 32 to rotate the indicating pin 42 away from the winding key handle to the distance indicated by the dotted line positions.

The position of the pins shows that the film has been exposed but must be changed and the next film be brought into position to prevent double exposure. The operator changes the film and at the same time operates the resetting device and restores the indicator for the next exposure of the film.

What I claim as new and desire to secure by Letters Patent in the United States is:

1. In an indicating device for cameras to prevent double exposure or loss of films, comprising a casing, a supply reel in the casing, a winding reel, a lens in the casing, a shutter for the lens, a lever for operating the shutter, a ratchet wheel operated by the shutter lever, and means in relation to the ratchet wheel for operating the indicating device, and a second means for resetting the indicating device simultaneously turning the film.

2. In an indicating device for cameras to prevent double exposure or loss of films, comprising a casing, a film supply reel in the casing, a winding reel, a lens in the casing, a shutter for the lens, a lever for operating the shutter, a ratchet pawl connected to the shutter lever, a ratchet wheel rotated by the movement of the pawl, a shaft on which the ratchet wheel rotates, and means for operating the indicator, and means connected to the shaft for resetting the indicator.

3. In an indicating device for cameras to prevent double exposure or loss of films, comprising a casing, a film supply reel in the casing, a winding reel, a lens in the casing, a shutter for the lens, a lever for operating the shutter, a ratchet pawl connected to the shutter lever, a ratchet wheel rotated by the movement of the pawl, a shaft on which the ratchet wheel rotates, an indicating pin mounted on the ratchet wheel, a follow-up device rotating independently of the ratchet wheel, and means for resetting the indicator.

4. In an indicating device for cameras to prevent double exposure or loss of films, comprising a casing, a film supply reel in the casing, a winding reel, a lens in the casing, a shutter for the lens, a lever operating the shutter, a ratchet pawl connected to the shutter lever, a ratchet wheel rotated by the movement of the pawl, a shaft on which the ratchet wheel rotates, an indicating pin mounted on the ratchet wheel, a follow-up device rotating independently of the ratchet wheel, a ratchet wheel rigidly secured to the shaft, and means for operating the ratchet wheel for resetting the device.

5. In an indicating device for cameras to prevent double exposure or loss of films, comprising a casing, a film supply reel in the casing, a winding reel, a lens in the casing, a shutter for the lens, a lever for operating the shutter, a ratchet pawl connected to the shutter lever, a ratchet wheel rotated by the movement of the pawl, a shaft on which the ratchet wheel rotates, an indicating pin mounted on the ratchet wheel, a follow-up device rotating independently of the ratchet wheel, a ratchet wheel rigidly secured to the shaft, a pawl for rotating the second ratchet wheel, a flexible cable for operating the pawl, and ratchet wheel for resetting the device.

6. In an indicating device for cameras to prevent double exposure or loss of films, comprising a casing, a film supply reel in the casing, a winding reel, a lens in the casing, a shutter for the lens, a lever for operating the shutter, a ratchet pawl connected to the shutter lever, a ratchet wheel rotated by the movement of the pawl, a shaft on which the ratchet wheel rotates, an indicating pin mounted independently of the ratchet wheel, a ratchet wheel rigidly secured to the shaft, a pawl for rotating the second ratchet wheel, a flexible cable for operating the pawl and ratchet wheel for resetting the device, a film-turning device on the reel, an eccentric on the shaft of the film-turning device, a flexible cable connected to the eccentric for resetting the device.

7. In an indicating device for cameras to prevent double exposure or loss of films, comprising a casing, a film supply reel in the casing, a winding reel, a lens in the casing, a shutter for the lens, a lever for operating the shutter, a ratchet pawl having a double advance movement for each reciprocation of the shutter lever, and means for operating the indicating device and resetting it.

DAVID P. THOMSON.